United States Patent [19]

Williams

[11] Patent Number: 4,660,592

[45] Date of Patent: Apr. 28, 1987

[54] BUTTERFLY VALVE

[76] Inventor: Mack H. Williams, 285 Colgate Ave., Kensington, Calif. 94708

[21] Appl. No.: 842,656

[22] Filed: Mar. 21, 1986

[51] Int. Cl.⁴ .......................... F16K 29/00; F16K 1/22
[52] U.S. Cl. .................................. 137/330; 137/242; 251/304; 251/305; 15/3.5
[58] Field of Search ....................... 251/304, 305, 326; 137/242, 330, 636.4, 614.16, 614.17, 614.18; 15/3.5, 104.06 R

[56] References Cited

U.S. PATENT DOCUMENTS

| | | | |
|---|---|---|---|
| 2,214,194 | 9/1940 | Frankley | 251/304 X |
| 2,819,034 | 1/1958 | Holderer | 137/330 X |
| 2,902,254 | 9/1959 | Conway et al. | 251/305 |
| 3,063,079 | 11/1962 | Bergman et al. | 251/326 X |
| 3,194,259 | 7/1965 | Garrod | 137/454.2 |

Primary Examiner—A. Michael Chambers
Assistant Examiner—John C. Fox
Attorney, Agent, or Firm—Melvin R. Stidham

[57] ABSTRACT

The disclosure is of a gate-like valve wherein a gate or carrier plate has upper and lower through bores movable into alignment with flow passages in the body. In the upper through bore is received a valve disc that is rotatable on the carrier between a closed position wherein it is in the plane of the gate to seal around the through bore and an open position wherein it is disposed along the axis of the through bore. A valve stem is coupled to the butterfly disc so that partial rotation of the stem operates the butterfly valve, and the stem is also engageable with the carrier plate so that when the stem is raised and lowered it raises and lowers the carrier plate to move the butterfly disc out of alignment with the flow passages.

3 Claims, 2 Drawing Figures

BUTTERFLY VALVE

BACKGROUND OF THE INVENTION

Butterfly valves are widely used in processing plants for controlling the flow of liquids and gases. Butterfly valves generally comprise a circular disc, which in closed position extends across the flow passage. In open position, turned through 90° with the edge of the disc exposed to the stream, the butterfly valve allows a smooth, almost unimpeded flow of fluid. However, since the valve disc remains in the line, it is not possible to pass a cleaning device or "pig", as is commonly employed to scour and clean the internal walls of a pipeline.

Some butterfly valves employ resilient elastomer sleeves or seal rings to seal around the circumference of the valve disc. Such seals are, however, subject to wear by caustic or abrasive liquids that are commonly used in processing plants to clean the pipe system.

OBJECTS OF THE INVENTION

It is an object of this invention to provide a butterfly valve with means for protecting the sealing surfaces and media when an abrasive cleaning fluid is circulated through the piping system.

It is a further object of this invention to provide a butterfly valve wherein the valve disc can easily be removed from the pipeline flow passage to enable the passage of a cleaning device.

Other objects and advantages of this invention will become apparent from the description to follow, particularly when read in conjunction with the accompanying drawings.

SUMMARY OF THE INVENTION

In carrying out this invention a valve body is provided with a carrier in the configuration of a gate valve. The carrier is provided with a through opening to be aligned with the pipeline flow passages, and rotatably mounted in the through opening of the carrier is a butterfly disc. A valve stem is coupled to the butterfly disc so that it can rotate the disc through 90° to control flow, and the stem is also attached to the valve carrier so that it can be lowered or raised to move the carrier-mounted butterfly disc into and out of alignment with the flow passageways.

DESCRIPTION OF A PREFERRED EMBODIMENT

Figure 1:
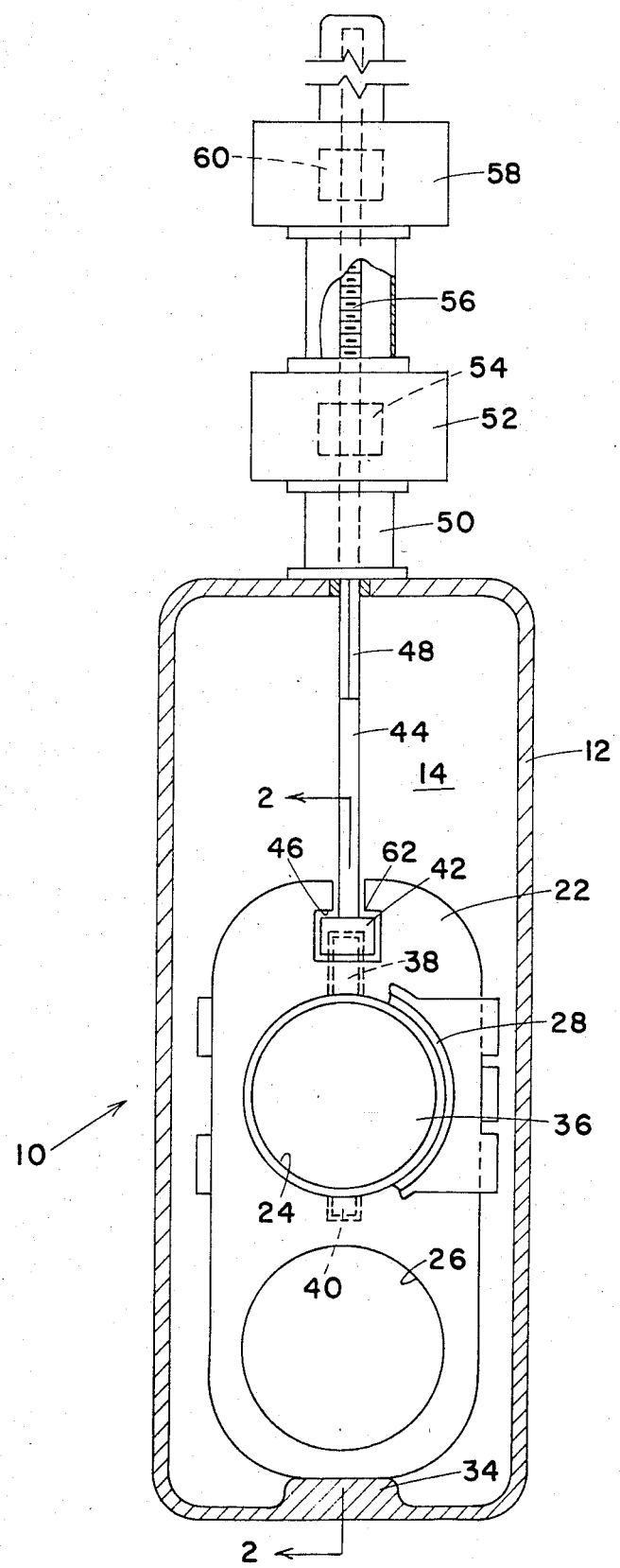
FIG. 1 is a vertical section view of an improved butterfly valve manufactured in accordance with this invention.

Referring now to the drawings, the improved butterfly valve 10 of this invention comprises a gate valve type body 12 having opposing end walls 14 (FIG. 2) with aligned flow passageways 16 therethrough. The flow passageways 16 are formed in hubs 18 that may include flanges 20 or other means for connection of the valve body 12 into a pipeline (not shown).

Slidably mounted in the body for vertical movement is a valve gate or carrier plate 22 having upper and lower through bores 24 and 26, either of which may be moved into alignment with the flow passageways 16 of the body 12. Seat rings 28 carrying main O-ring seals 30 and body O-rings 32 are positioned in the body on opposite sides of the gate 22 to seal around the particular through opening 24 or 26, that is positioned in alignment therewith. In the lower position of the gate 22, as defined by engagement with a bottom stop member 34 in the body, the upper through bore 24 is in alignment with the flow passages 16.

Figure 2:
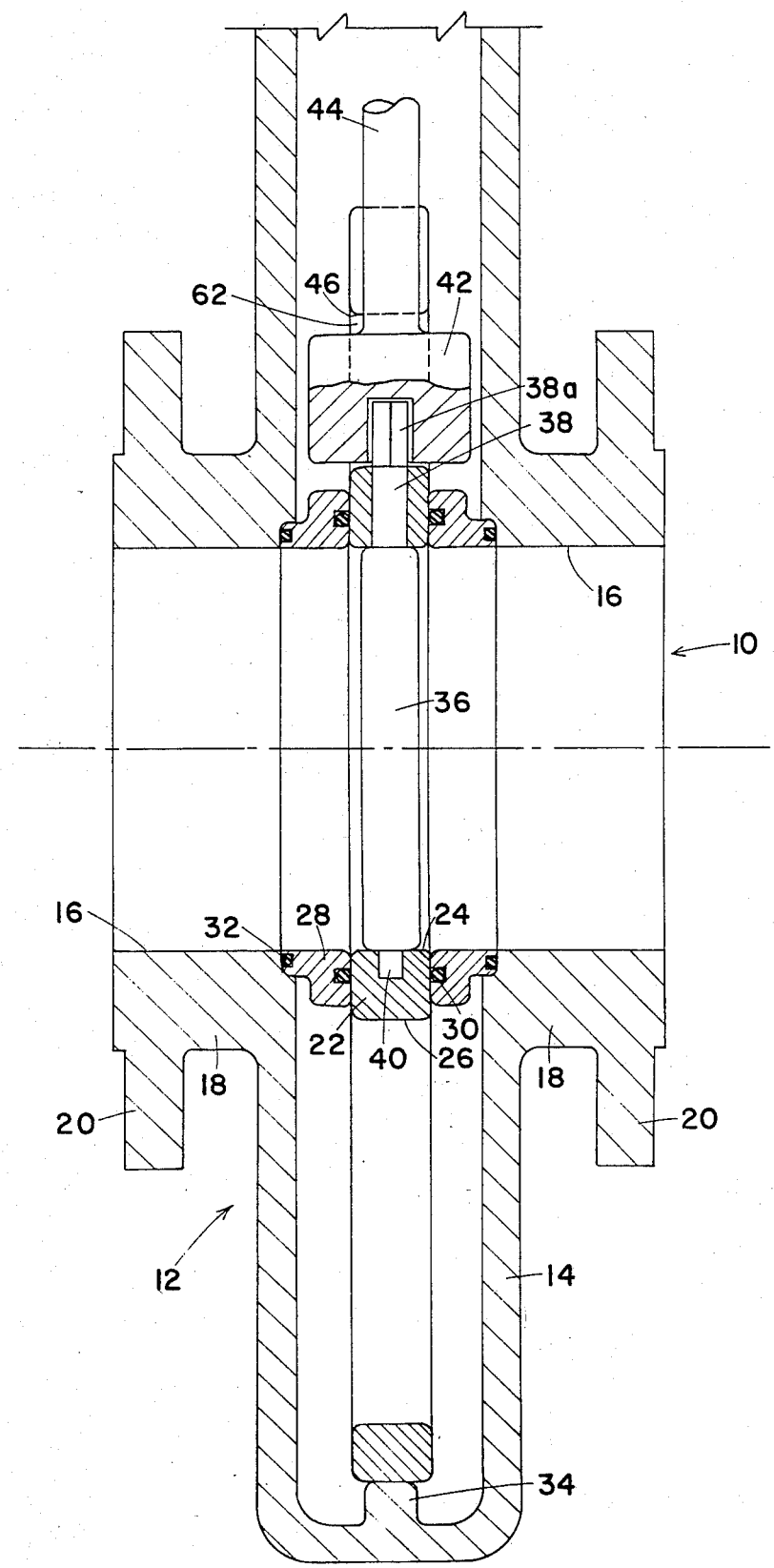
FIG. 2 is a section view taken along line 2—2 of FIG. 1.

A butterfly disc 36 carrying an upper actuator shaft 38 and a lower stub shaft 40, is rotatably carried in the gate or carrier 20 within the upper through bore 24. The butterfly disc is adapted to rotate from the position shown, wherein it extends across the through valve bore 24 and flow passageways 16, through 90° to a position in alignment with the axis of the through bore 24. As shown in FIG. 2, the thickness of the butterfly disc 36 is less than that of the gate or carrier plate 22 so as not to interfere with vertical movement of the carrier plate 22 between the valve seats 28.

The gate or carrier plate 22 is raised and lowered by engagement of an enlarged head on a valve stem 44 in a gate jaw 46 at the top of the carrier plate 22. A square intermediate portion 48 of the stem 44 extends upward through a packing assembly and yoke 50 and then through a lower operator 52 wherein it is engaged by a complementary power wrench 54. Then, a threaded upper portion 56 of the stem 44 extends through an upper operator 58 wherein it is engaged by a power stem nut 60. When the lower operator 52 is activated, the stem 44 is rotated through 90° whereby the butterfly disc 36, by engagement of the square head 38a of the upper shaft 38 with the stem base 42, is also turned through 90°. Of course, the butterfly disc 36 can only be turned when the valve carrier plate 22 is in its lower position shown with the disc 36 in alignment with the flow passages. Because the partial rotation of the stem may cause it to thread up or down a small distance through the threaded upper valve operator, a small clearance 62 is provided between the enlarged valve stem head 42 and the gate jaw 46 so that the slight axial movement of the stem 44 will not be transmitted to the valve carrier plate or gate 22.

When it is desired to remove the butterfly valve 36 from the line 16, the upper operator 58 is activated with the butterfly disc 36 in closed position to cause the stem 44 to be moved upward to bring the lower through opening 26 in the gate 22 into alignment with the flow passageways 16. In this position, the seat rings 28 still seal around the gate and, therefore, the butterfly assembly is in sealed isolation from the pipeline flow passageways. Accordingly, a cleansing fluid or even a solid cleaning device can be passed through the pipeline and flow passages 16 and 26 without impedance and without causing any damage to the butterfly sealing surfaces.

While this invention has been described in conjunction with a preferred embodiment thereof, it is obvious that modification and changes therein may be made by those skilled in the art to which it pertains without departing from the spirit and scope of this invention, as defined by the claims appended hereto.

What is claimed as invention is:

1. A valve structure comprising:
    a gate valve type body including a pair of opposing end walls having aligned circular flow passages therethrough;

a gate-like carrier plate movable between and parallel to said end walls;

a through opening in said carrier plate of substantially the size of said flow passageways;

a butterfly disc received coaxially in said through opening and rotatably mounted on said carrier about a vertical axis;

a valve stem;

interengaging means on said stem and said carrier plate for raising and lowering said carrier plate with said stem;

means coupling said butterfly disc to said stem for rotation therewith;

means for rotating said stem partially;

means for raising and lowering said stem to move said carrier plate between a first position wherein said through opening is in alignment with said flow passages and a second position displaced therefrom; and a lower through bore in said carrier plate disposed to be in alignment with said flow passages when said carrier plate is in said second position.

2. The valve structure defined by claim 1 including:

annular seal means on said body engageable on both sides of said carrier plate to seal around said through opening and said lower through bore when aligned therewith.

3. The valve structure defined by claim 1 wherein said means for raising and lowering said stem comprise:

threads around said stem; and a stem nut on said valve body threadedly receiving said stem.

* * * * *